Figure 1:
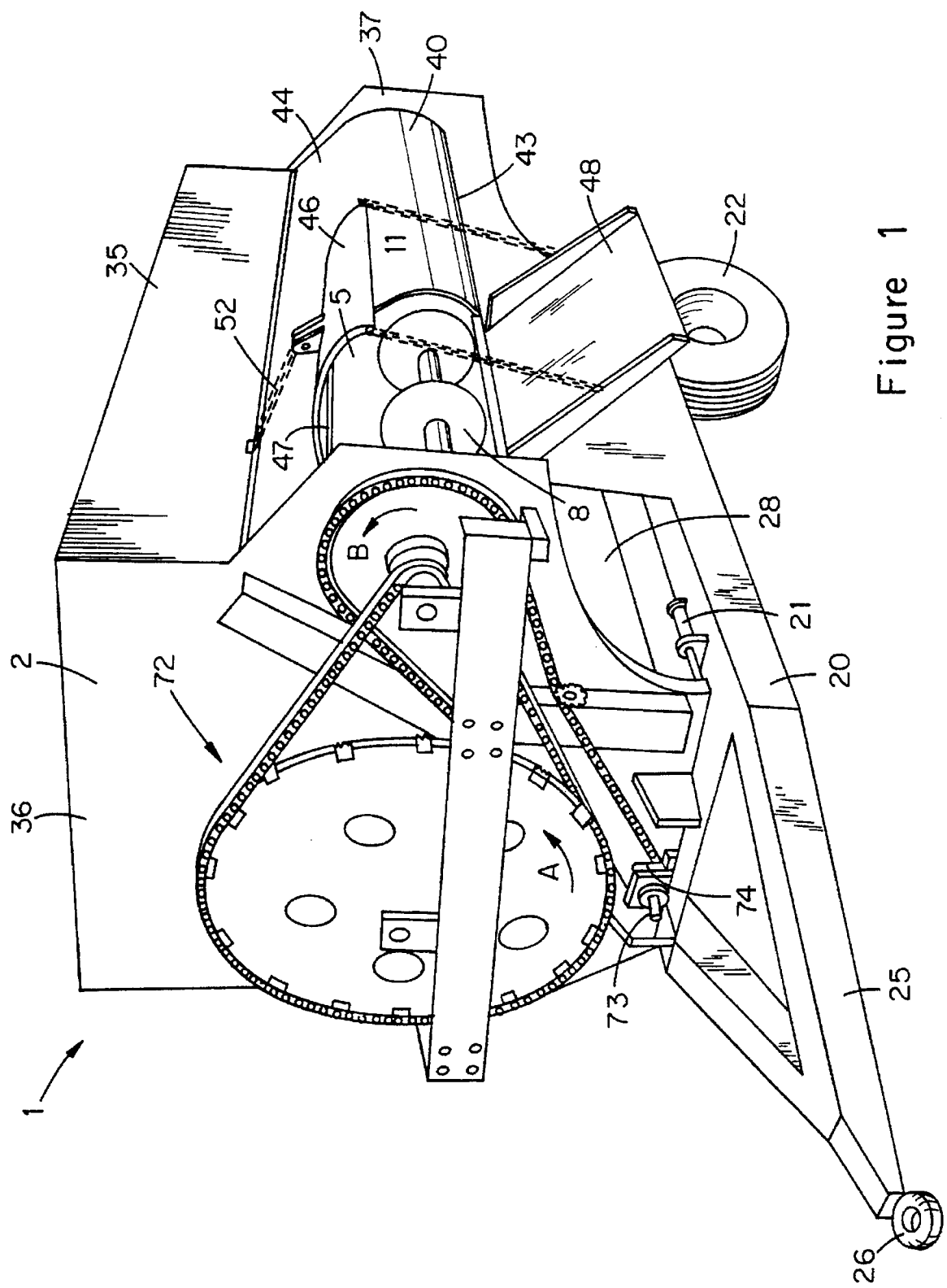

United States Patent [19]
O'Neill et al.

[11] Patent Number: 5,645,345
[45] Date of Patent: Jul. 8, 1997

[54] APPARATUS FOR MIXING FIBROUS TYPE MATERIAL

[75] Inventors: Oliver O'Neill, Kilgreaney; Thomas Foley, Borris, both of Ireland

[73] Assignee: Salford Engineering Limited, Borris, Ireland

[21] Appl. No.: 522,250

[22] PCT Filed: Mar. 10, 1995

[86] PCT No.: PCT/IE94/00014
    § 371 Date: Sep. 11, 1995
    § 102(e) Date: Sep. 11, 1995

[87] PCT Pub. No.: WO94/19932
    PCT Pub. Date: Sep. 15, 1994

[30] Foreign Application Priority Data

Mar. 10, 1993 [IE] Ireland ............... S930177

[51] Int. Cl.$^6$ .................................. B01F 7/04
[52] U.S. Cl. ................ 366/186; 366/299; 366/603
[58] Field of Search .................. 366/186, 190, 366/192, 193, 194, 195, 196, 603, 279, 297, 298, 299, 300

[56] References Cited

U.S. PATENT DOCUMENTS

| 2,813,704 | 11/1957 | MacKissic | 366/194 |
| 4,298,289 | 11/1981 | Walley | 366/196 |
| 4,310,252 | 1/1982 | Ryan | 366/193 |
| 4,597,672 | 7/1986 | Neier | 366/196 |
| 4,756,626 | 7/1988 | Neier | 366/279 |

FOREIGN PATENT DOCUMENTS

| 0029095 | 5/1981 | European Pat. Off. . |
| 2139911 | 11/1984 | United Kingdom . |
| 2225201 | 5/1990 | United Kingdom . |

Primary Examiner—Robert W. Jenkins
Attorney, Agent, or Firm—Lowe, Price, LeBlanc & Becker

[57] ABSTRACT

A mixer feeder wagon (1) comprises a mixing compartment (4) and a dispensing compartment (5). A mixing rotor (7) rotatable in the mixing compartment (4) mixes animal feed therein and urges the mixed animal feed into the dispensing compartment (5) through a communicating opening (6). A dispensing auger (8) in the dispensing compartment (5) dispenses the mixed animal feed through a dispensing outlet (11). The mixing rotor (7) comprises a rotor shaft (55) and a plurality of mixing paddles (56) carried by radial carrier members (57). Each mixing paddle (56) comprises a radial leading surface (69) and a bevelled trailing surface (71) which define an included acute angle α of approximately 45° for preventing a build up of dry fibrous ingredients on the paddles (56).

20 Claims, 5 Drawing Sheets

APPARATUS FOR MIXING FIBROUS TYPE MATERIAL

The present invention relates to apparatus for mixing and dispensing fibrous type material, for example, forage, which includes hay, straw, silage and in particular, relatively long cut silage and the like, which is commonly used in the preparation of an animal feed ration. The apparatus is of the type which comprises a container defining a hollow interior region which forms an elongated mixing compartment of substantially semi-circular transverse cross-section defining a longitudinally extending main central axis which is co-axial with the axis of generation of the semi-circular portion of the mixing compartment, a mixing rotor being rotatable in the mixing compartment about a rotational axis coinciding with the main central axis, the mixing rotor comprising at least one mixing paddle for mixing material in the mixing compartment, the mixing paddle extending substantially longitudinally relative to the main central axis and having a leading surface extending substantially longitudinally and radially relative to the main central axis and terminating in an outer free edge extending in a generally longitudinal direction and defining an outer peripheral edge of the mixing paddle.

Such apparatus for mixing and dispensing animal feed rations, in general, is referred to as a mixer feeder wagon. A typical example of such apparatus is disclosed in British Patent Specification No. 2,139,911A and European Patent Specification No. 0,427,483A. Such mixer feeder wagons comprise a mixing compartment and a dispensing compartment which communicates with the mixing compartment. A mixing rotor is rotatably mounted in the mixing compartment for mixing the ingredients of the feed ration therein. A dispensing means, typically, a dispensing auger is located in the dispensing compartment for dispensing the mixed feed ration from the dispensing compartment through a dispensing outlet from the dispensing compartment. Typically, the mixing compartment is formed by a base of semi-cylindrical shape and the mixing rotor is rotatably mounted in the mixing compartment with the rotational axis of the mixing rotor coinciding with the axis of generation of the semi-cylindrical base. The mixing rotor comprises a main rotor shaft and a plurality of peripherally located mixing paddles carried on carrier members which extend radially from the mixing shaft. Each mixing paddle is formed by an elongated angle member comprising a pair of webs extending at 90° to each other. One web defines a leading surface which extends longitudinally and radially relative to the rotational axis of the mixing rotor, and extends radially inwardly from the other web which forms a trailing surface which is tangential to the locus of movement of the outer peripheral edge of each paddle. Accordingly, as the mixing rotor rotates in the mixing compartment the trailing surface sweeps past the semi-cylindrical base portion of the mixing compartment. While this type of mixing and dispensing apparatus with such mixing paddles is quite adequate for mixing the ingredients of most animal feed rations, it has been found in certain circumstances that where the animal feed comprises ingredients of relatively high fibrous content, for example, hay, straw and long cut silage, and in particular, where the ingredients of the animal feed ration are relatively dry, fibrous material may collect on the mixing paddles and it has been found that such fibrous material extends rearwardly over the trailing surface of each mixing paddle. It has been found that the interaction between the collected fibrous material on the trailing surface of each mixing paddle and the semi-cylindrical base of the mixing compartment causes significant frictional resistance between the mixing rotor and the semi-cylindrical base, which in turn significantly increases the power requirement to rotate the mixing rotor. This problem has been found to arise in particular, where the feed ration comprises relatively dry fibrous material, such as, silage and is of dry matter content of 30% and greater, and in particular, of dry matter content of the order of 60%. Similar problems have been found where the animal feed ration comprises straw or hay which itself has a relatively high dry matter content.

There is therefore a need for apparatus for mixing and dispensing an animal feed ration which contains fibrous material and is of relatively high dry matter content, which overcomes this problem.

The present invention is directed towards providing such an apparatus.

According to the invention there is provided apparatus for mixing and dispensing fibrous materials apparatus for mixing and dispensing fibrous materials, the apparatus comprising a container defining a hollow interior region which forms an elongated mixing compartment of substantially semi-circular transverse cross-section defining a longitudinally extending main central axis which is co-axial with the axis of generation of the semi-circular portion of the mixing compartment, a mixing rotor being rotatable in the mixing compartment about a rotational axis coinciding with the main central axis, the mixing rotor comprising at least one mixing paddle for mixing material in the mixing compartment, the mixing paddle extending substantially longitudinally relative to the main central axis and having a leading surface extending substantially longitudinally and radially relative to the main central axis and terminating in an outer free edge extending in a generally longitudinal direction and defining an outer peripheral edge of the mixing paddle, wherein the mixing paddle is further provided with a bevelled trailing surface extending from the outer free edge of the leading surface and defining with the leading surface an included acute angle.

By virtue of the fact that the mixing paddle is provided with a bevelled trailing surface, the apparatus is particularly suitable for mixing fibrous material, and in particular, fibrous material with a relatively high dry matter content. For example, the apparatus is particularly suitable for mixing animal feed which contains a relatively large proportion of hay, straw, silage and in particular, long cut silage, or indeed, any proportion of such fibrous materials with other ingredients which together provide an animal feed ration with a relatively high dry matter content. It is believed that by virtue of the fact that the mixing paddle is provided with a bevelled trailing surface the build up of fibrous material on the mixing paddle is minimised, and in most cases, eliminated. By virtue of the fact that fibrous material does not build up on the mixing paddles other ingredients of the animal feed do not accumulate on the mixing paddle. Thus, by virtue of the fact that there is virtually no build up of material on the mixing paddle, and in particular, on the trailing surface of the mixing paddle, the frictional resistance between the mixing paddle and the inner semi-circular surface of the mixing compartment is relatively low, thus, the frictional forces between the mixing paddle and the inner surface of the mixing compartments are relatively low, and thus, the power requirement of the mixing rotor to overcome any such frictional forces is relatively low. In this way, the power requirement for rotating the mixing rotor for mixing the animal feed is significantly lower than the power requirement for rotating the mixing rotor of known mixer feeder wagons of the type described above.

Preferably, the included acute angle between the leading surface and the trailing surface is in the range of 20° to 70°. Advantageously, the included acute angle between the leading surface and the trailing surface is in the range of 30° to 60°. In a preferred aspect of the invention the included acute angle between the leading surface and the trailing surface is approximately 45°. It has been found that where the acute angle between the leading surface and the trailing surface is approximately 45° optimum results are achieved and the power requirement of the mixing rotor is minimum. However, it has been found that good results can be achieved where the acute angle between the leading surface and the trailing surface of the mixing paddle is retained between 30° and 60°. It has been found that reasonable results are achieved when the acute angle between the leading surface and the trailing surface is maintained in the broader range of 20° to 70°.

In one aspect of the invention each mixing paddle is of triangular transverse cross-section, the leading and trailing surfaces being respectively formed by two sides of the triangle, the leading surface extending radially outwardly from the third side of the triangle.

Advantageously, the leading surface extends perpendicularly from the third side of the triangle.

Preferably, each mixing paddle is of hollow transverse cross-section.

In one aspect of the invention each mixing paddle is formed by an elongated member of angle transverse cross-section having a pair of angularly disposed side webs, one of the side webs forming the leading surface, and an elongated plate member extending parallel to the angle member joining free edges of the respective side webs, the plate member forming the trailing surface. It has been found that this is a particularly advantageous construction, leading to a mixing paddle which can readily easily and simply be constructed and provided, and is also relatively robust in use, and provides particularly good results.

In another aspect of the invention the mixing rotor comprises a rotor shaft rotatably mounted in the mixing compartment, the rotor shaft defining the rotational axis of the mixing rotor, each mixing paddle being carried on at least one carrier member extending radially from the rotor shaft. Preferably, each mixing paddle is carried on a pair of carrier members spaced apart longitudinally along the rotor shaft. Advantageously, each mixing paddle extends between a pair of carrier members.

Preferably, each mixing paddle is mounted to its corresponding carrier members adjacent the outer free radial end thereof.

In one aspect of the invention the ratio of the radial width of the leading surface of each mixing paddle to the radius of the peripheral edge of the leading surface of the mixing paddle from the rotational axis of the mixing rotor is in the range of 1:20 to 1:2. Preferably, the ratio of the radial width of the leading surface of each mixing paddle to the radius of the peripheral edge of the leading surface of the mixing paddle from the rotational axis of the mixing rotor is in the range of 1:12 to 1:5, and advantageously, the ratio is in the range of 1:10 to 1:7. To some extent, the ratio of the radial width of the leading surface of each mixing paddle to the radius of the peripheral edge of the leading surface of the mixing paddle from the rotational axis of the mixing rotor will be dependent on the outer peripheral diameter of the mixing rotor, and this will be dependent on the capacity of the mixing compartment. However, in a preferred embodiment of the invention, the ratio of the radial width of the leading surface of each mixing paddle to the radius of the peripheral edge of the leading surface of the mixing paddle from the rotational axis of the mixing rotor is approximately 1:9. In another preferred embodiment of the invention, the ratio is approximately 1:7.46, and in another preferred embodiment of the invention the ratio is approximately 1:8.30. It has been found that where the ratio of the radial width (r) of the leading surface of each mixing paddle to the radius (R) of the peripheral edge of the leading surface of the mixing paddle from the rotational axis of the mixing rotor is either 1:9, 1:7.46 and 1:8.30, particularly advantageous results are achieved. It has been found that the mixing action of the mixing paddles on the ingredients is particularly efficient. Reasonably good results are achieved when the ratio of r:R is in the range of 1:10 to 1:7, and adequate results are achieved when the ratio is in the range of 1:12 to 1:5, and it has been found that even where the ratio is in the broader range of 1:20 to 1:2, a workable arrangement is achieved. In a further aspect of the invention the trailing surface defines a longitudinally extending inner edge spaced apart from the rotational axis of the mixing rotor, the radial distance between the outer peripheral edge of the leading surface and the inner edge of the trailing surface being substantially similar to the radial width of the leading surface.

In one aspect of the invention the radial width of the leading surface of each mixing paddle is in the range of 50 mm to 300 mm, and advantageously, the radial width of the leading surface of each mixing paddle is approximately 100 mm. A mixing paddle with a leading surface of radial width of approximately 100 mm produces particularly advantageous results, and furthermore, acts on the ingredients with a particularly efficient mixing action. Where the radial width of the leading surface of the mixing paddle is maintained within the broader range of 50 mm to 300 mm, reasonably good results are achieved.

In a preferred aspect of the invention the substantially semicylindrical portion of the mixing compartment forms the base of the mixing compartment.

Advantageously, the mixing compartment defines an upwardly directed open mouth for providing access to the mixing compartment.

In another preferred aspect of the invention the hollow interior region of the container forms a dispensing compartment through which material is dispensed from the apparatus through a dispensing outlet which is formed in the dispensing compartment, the dispensing compartment defining a longitudinally extending central axis, and extending substantially parallel to the mixing compartment and communicating with the mixing compartment through a communicating opening, the communicating opening lying in a plane extending substantially parallel to the main central axis, a dispensing means being located in the dispensing compartment for dispensing the material from the dispensing compartment.

Preferably, a closure means is provided for isolating the dispensing compartment from the mixing compartment, the closure means being operable between a closed position closing the communicating opening to an open position with the two compartments communicating through the communicating opening. Advantageously, the dispensing compartment extends sidewardly outwardly from the mixing compartment for accommodating passage of material to and from the dispensing compartment between the mixing and dispensing compartments. Preferably, the dispensing compartment is of partly circular transverse cross-section defining an axis of generation which forms the secondary central axis of the dispensing compartment.

It is preferable that the dispensing outlet should be located in the partly circular portion of the dispensing compartment and adjacent the downstream end thereof. It is also preferable that the main and secondary central axes should lie in a substantially horizontal plane.

Preferably, the base of the mixing compartment terminates in a lower wall of the dispensing compartment and defines a lower edge of the communicating opening. Advantageously, the communicating opening extends in a substantially vertical plane.

In a preferred construction of the apparatus the container comprises a side wall extending in a generally upwardly direction defining portion of the mixing compartment, a lower edge of the side wall defining with the base of the mixing compartment opposite edges of the communicating opening. Additionally, in a preferred construction of the apparatus, the dispensing means comprises a dispensing auger for urging material from an upstream end to a downstream end the dispensing compartment, the dispensing auger being rotatably mounted in the dispensing compartment and defining a rotational axis coinciding with the secondary central axis. Advantageously, the dispensing compartment extends substantially the length of the mixing compartment.

Figure 2:
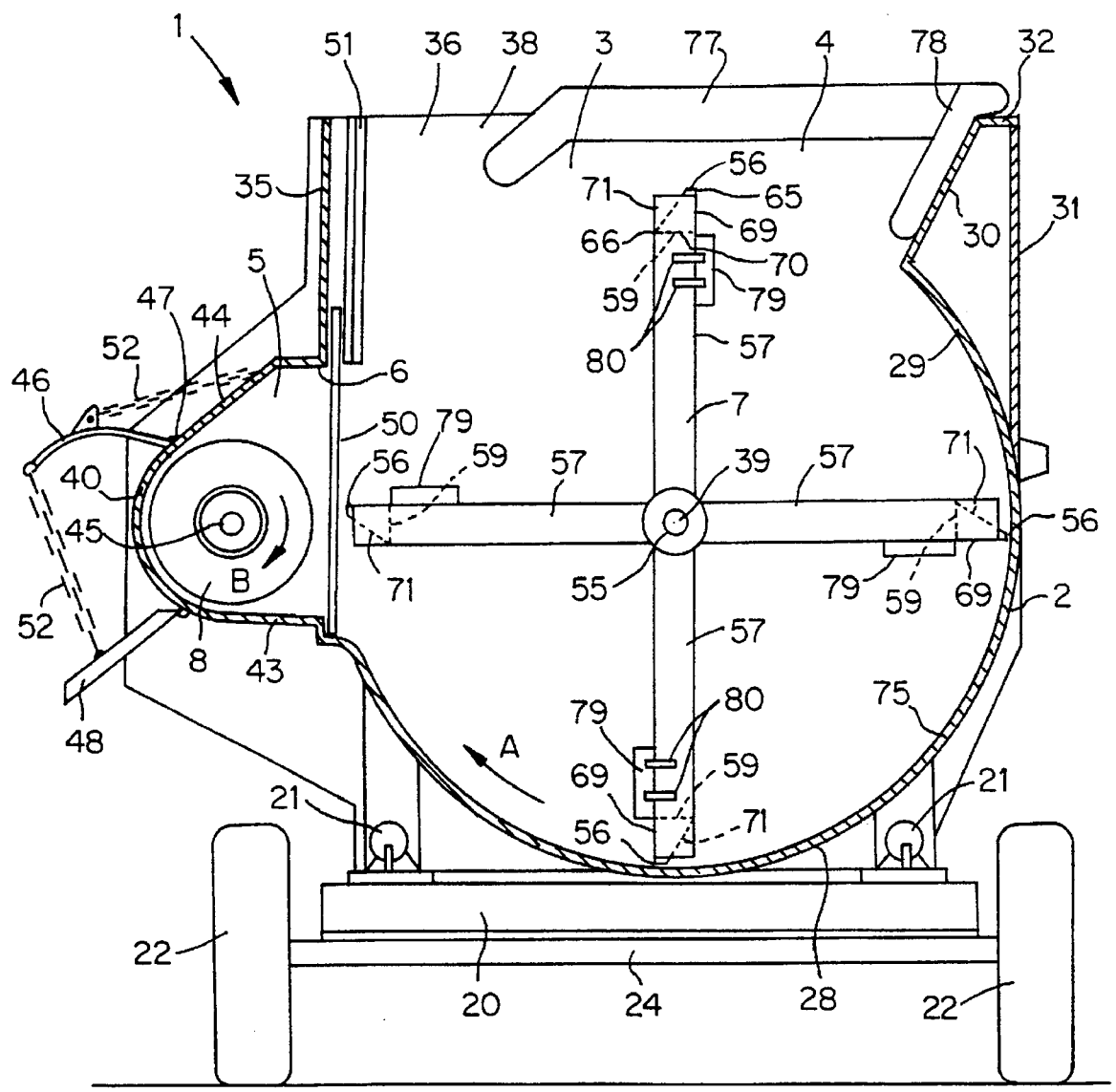
Figure 7:
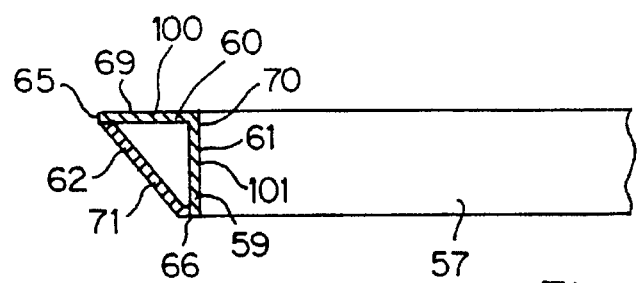
Figure 6:
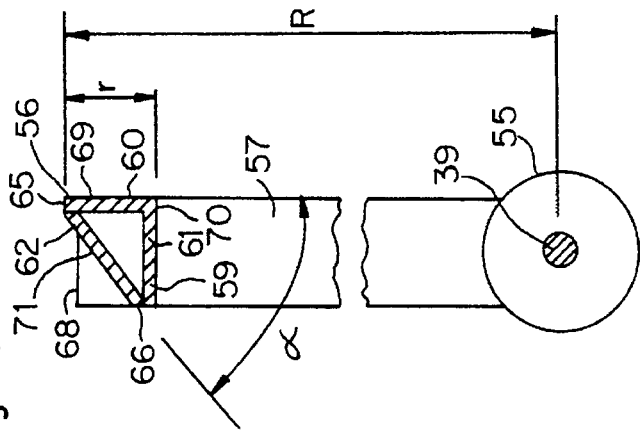
Figure 4:
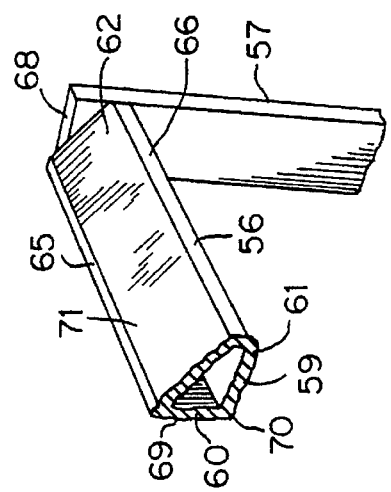
Figure 3:
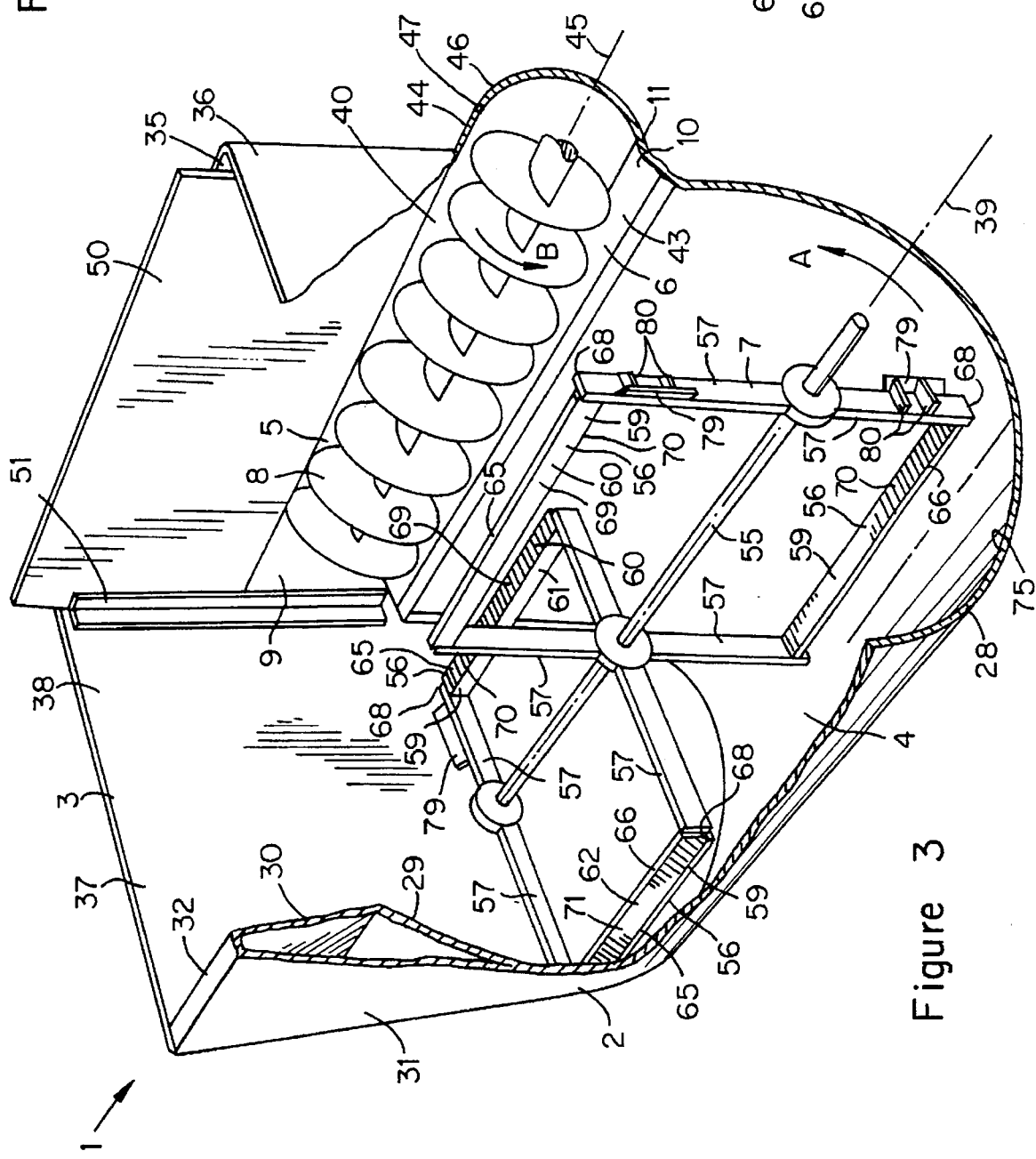
Figure 10:
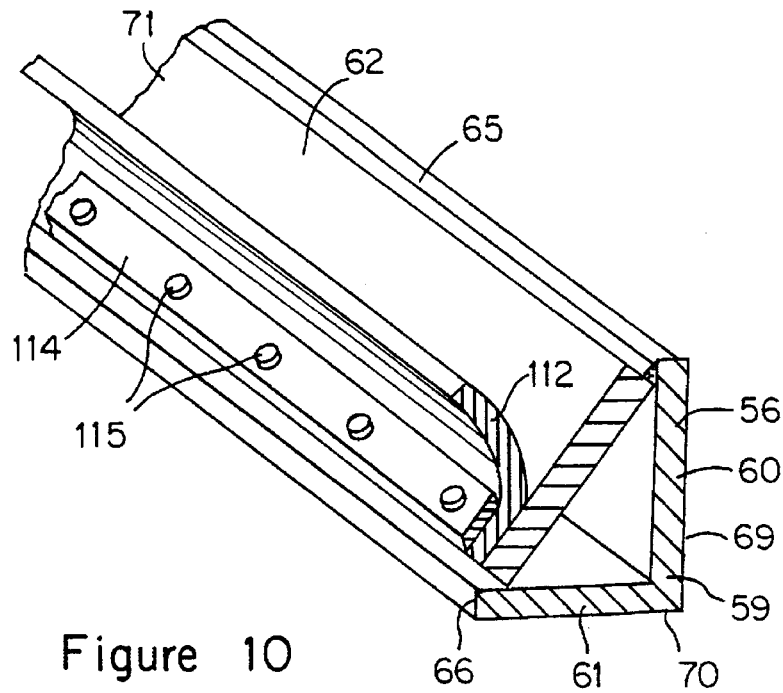
Figure 5:
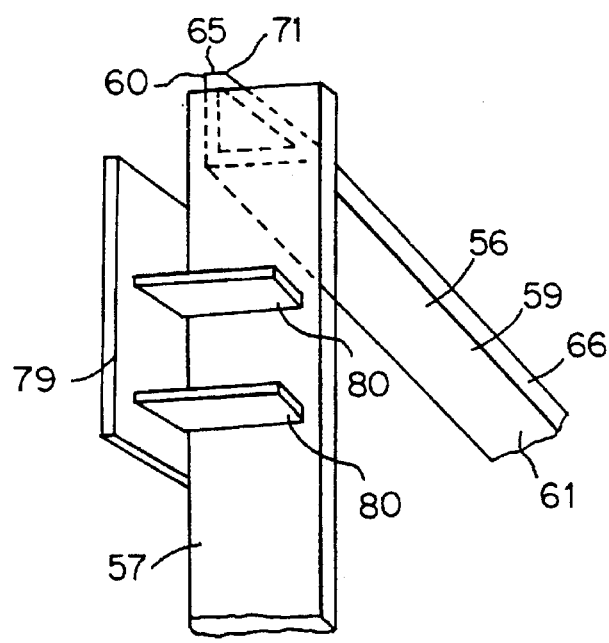
Figures 8, 9:
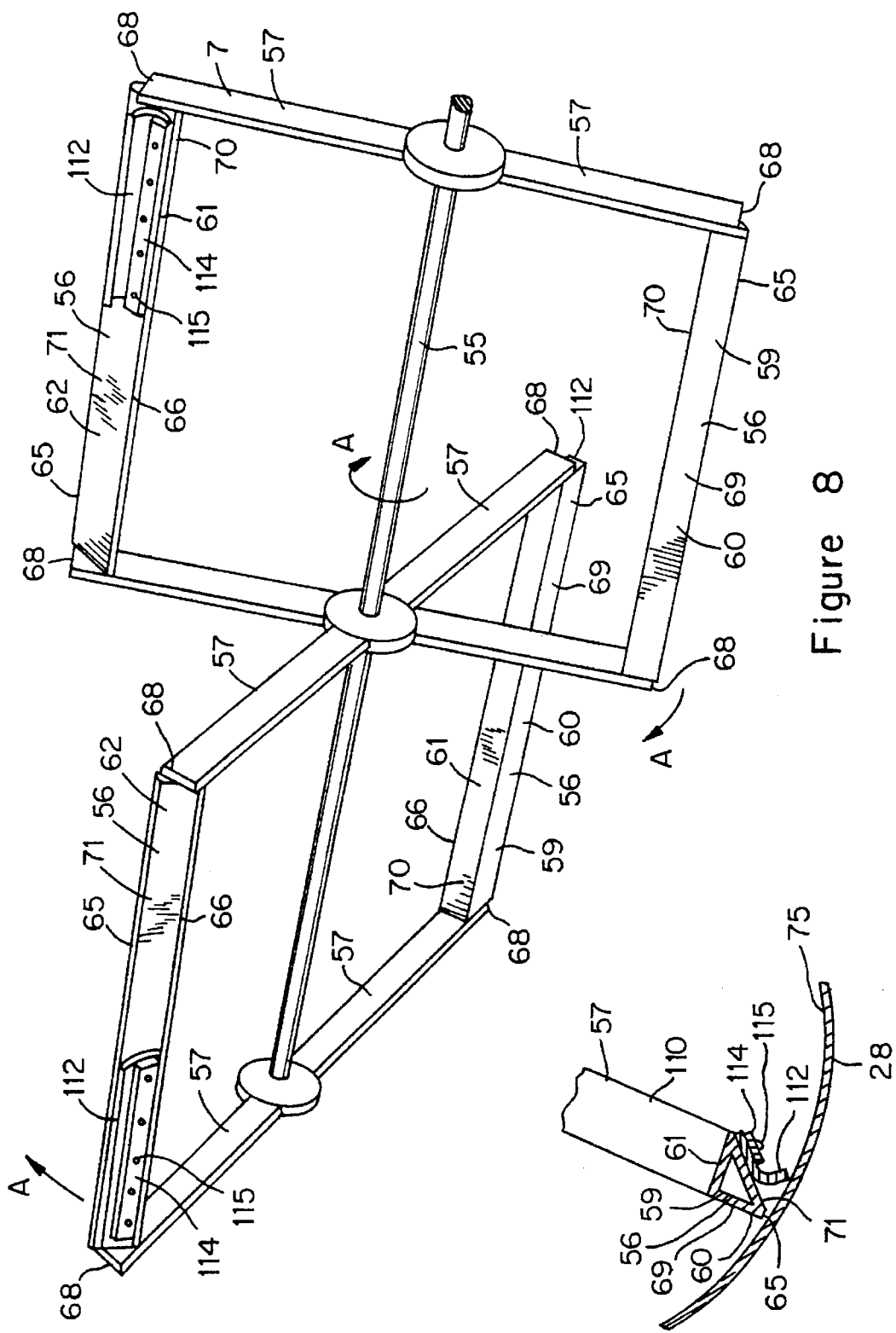

The invention will be more clearly understood from the following description of some preferred embodiments thereof which are given by way of example only, with reference to the accompanying drawings, in which:

FIG. 1 is a perspective view of apparatus according to the invention for mixing and dispensing animal feed, FIG. 2 is a sectional end elevational view of the apparatus of FIG. 1 looking from the rear towards the front, FIG. 3 is a cut away perspective view of a portion of the apparatus of FIG. 1, FIG. 4 is a perspective view of a detail of the apparatus of FIG. 1, FIG. 5 is a perspective view of the detail of FIG. 5 from a different direction, FIG. 6 is an end view of a portion of the apparatus of FIG. 1, FIG. 7 is a view similar to FIG. 6 of a similar portion of apparatus according to another embodiment of the invention for mixing and dispensing animal feed, FIG. 8 is a perspective view of a portion of apparatus according to another embodiment of the invention, FIG. 9 is a cross-sectional view of a detail of the apparatus of FIG. 8, and FIG. 10 is a perspective view of a detail of the apparatus of FIG. 10.

Referring to the drawings and initially to FIGS. 1 to 6, there is illustrated apparatus according to the invention, in this case, a mixer feeder wagon indicated generally by the reference numeral 1 for mixing and dispensing animal feed. The wagon 1 is particularly suitable for mixing and dispensing an animal feed ration which contains fibrous material and is of relatively high dry matter content, such as, for example, hay, straw and long cut silage and the like with a dry matter content of, for example, 30% or greater, and particularly, where the dry matter content is of the order of 60%. The wagon 1, in general construction, is somewhat similar to the apparatus disclosed in British Patent Specification No. 2,139,911A and European Patent Specification No. 0,427,483A, and for convenience, the general construction of the wagon 1 will be only briefly described, it being understood that those skilled in the art will have a sufficient knowledge of the wagon from British Patent Specification No. 2,139,911A and European Patent Specification No. 0,427,483A, and only the inventive aspect of the invention will be described in detail.

The wagon 1 comprises a container 2 which defines a hollow interior region 3 which forms a mixing compartment 4 within which the ingredients which constitute the animal feed ration are mixed and a dispensing compartment 5 through which the mixed animal feed ration is dispensed. The dispensing compartment 5 communicates with the mixing compartment 4 through a communicating opening 6 for receiving mixed animal feed from the mixing compartment 4 for dispensing therefrom.

A mixing rotor 7 is rotatably mounted in the mixing compartment 4 for mixing material therein and for urging mixed material into the dispensing compartment 5 through the communicating opening 6. A dispensing means, namely, a dispensing auger 8 is rotatably mounted in the dispensing compartment 5 for urging mixed animal-feed in the dispensing compartment 5 from an upstream end 9 to a downstream end 10 through a dispensing outlet 11.

The container 2 is supported on a chassis 20 by four load cells 21 to facilitate weighing of the ingredients as they are being loaded into the mixing compartment 4. A pair of ground engaging wheels 22 are rotatably carried on an axle 24 secured to the chassis 20. A forwardly extending portion 25 of the chassis 20 carries a tow hitch 26 for coupling the wagon 1 to a towing vehicle, typically, a tractor (not shown).

The mixing compartment 4 comprises a lower portion of semi-circular transverse cross-section which is formed by a base 28 of substantially semi-cylindrical construction. A side wall 29 of partly circular cross-section extends upwardly from the base 28 on one side thereof and terminates in a downwardly inwardly inclined side wall 30. An outer side wall 31 extending upwardly from the base 28 adjacent its line of engagement with the side wall 29 carries an inwardly directed top wall 32 which terminates in the downwardly inclined side wall 30. A side wall 35 extends upwardly on the opposite side of the base 28 and defines with the base 28 the communicating opening 6. Front and rear end walls 36 and 37, respectively, close the ends of the mixing compartment 4 and the dispensing compartment 5. The side walls 30 and 35 and end walls 36 and 37 form an upwardly directed open mouth 38 to the mixing compartment 4. The base 28 and side wall 29 define a common axis of generation which coincides with and forms a longitudinally extending main central axis 39 of the mixing compartment 4.

The dispensing compartment 5 extends the length of the mixing compartment 4 and extends parallel to the mixing compartment 4. The dispensing compartment 5 also extends sidewardly outwardly from the mixing compartment 4 to facilitate passage of mixed material to and from the dispensing compartment 5 between the mixing compartment 4 and the dispensing compartment 5. An elongated partly cylindrical side wall 40 extends the length of the dispensing compartment 5 and is joined to the base 28 and the side wall 35 by a lower wall 43 and an upper wall 44, respectively, which together with the partly cylindrical side wall 40 form the dispensing compartment 5. As can be seen in FIG. 2 the lower wall 43 extends substantially horizontally between the base 28 and the side wall 40. The side wall 40 defines an axis of generation which coincides with and defines a secondary central axis 45 of the dispensing compartment 5. The dispensing auger 8 is rotatably mounted in bearings (not shown) in the front and rear end walls 36 and 37 and is rotatable about a rotational axis which coincides with the secondary central axis 45. A door 46 which is hingedly connected to the side wall 40 by hinges 47 closes the dispensing outlet 11. A chute 48 hingedly connected to a lower edge of the dispensing outlet 11 directs animal feed dispensed through the dispensing outlet 11 by the dispensing auger 8.

A closure means, namely, a closure plate 50 slidable in tracks 51 in the end walls 36 and 37 isolates the dispensing compartment 5 from the mixing compartment 4 to facilitate mixing of the animal feed in the mixing compartment 4. An hydraulic ram (not shown) operates the closure plate 50 through a transmission linkage (also not shown) between a raised open position illustrated in FIG. 3 with the two compartments 4 and 5 communicating for dispensing animal feed, and a lower closed position illustrated in FIG. 2 with the two compartments 4 and 5 isolated. A chain 52 is connected between the door 46 and the transmission linkage (not shown) for operating the closure plate 50, so that on the closure plate 50 being moved into the raised open position the door 46 is opened and vice-versa. Chains 53 interconnect the door 46 and the chute 48 for raising the chute 48 on opening of the door 46.

The mixing rotor 7 comprises a main rotor shaft 55 which is rotatably carried in bearings (not shown) in the front and rear end walls 36 and 37 about a rotational axis which coincides with the main central axis 39. Four elongated mixing paddles 56 are carried at the periphery of the mixing rotor 7 on respective pairs of carrier members 57 which extend radially outwardly from the rotor shaft 55. The carrier members 57 are of flat stock steel of 150 mm by 20 mm. The mixing paddles 56 are arranged in pairs, the paddles 56 of each pair being spaced at 180° relative to each other around the rotor shaft 55, and each pair of mixing paddles 56 being disposed at 90° relative to each other.

Each mixing paddle 56 extends longitudinally of the mixing compartment 4 and parallel to the main central axis 39. Each mixing paddle 56 is of hollow construction, and comprises an elongated angle member 59 of steel having webs 60 and 61 disposed at right angles to each other and joined by an elongated plate 62 of steel extending the length of the angle member 59 and between free edges 65 and 66 of the side webs 60 and 61, respectively. The plate 62 is seam welded to the angle member 59 along the full length of the free edges 65 and 66. The angle member 59 and the plate 52 of each mixing paddle 56 extend between, and are welded to the corresponding pair of carrier members 57 adjacent the outer radial ends 68 of the carrier members 57. The web 60 of each angle member 59 forms a leading surface 69 of the mixing paddle 56 which engages the ingredients of the animal feed as the mixing rotor 7 rotates in the direction of the arrow A. The leading surface 69 extends longitudinally along the mixing paddle 56 and radially inwardly from the outer peripheral free edge 65 of the web 60 to an inner edge 70 of the web 60. The plate 62 forms a bevelled trailing surface 71 which extends from the outer peripheral edge 65 and defines with the leading surface 69 an included acute angle $\alpha$ of 45°, see FIG. 6.

In this embodiment of the invention the angle member 59 forming each mixing paddle 56 is of 100 mm by 100 mm by 10 mm. In other words, the radial width r between the peripheral outer edge 65 and the inner edge 70 of the leading surface 69 is 100 mm. The distance between the inner edge 70 and the edge 66 of each angle member 59 is also 100 mm. The thickness of the webs 60 and 61 is 10 mm. The plate 62 of each mixing paddle 56 is approximately 130 mm wide by 10 mm thick, so that the plate 62 extends between the free edges 65 and 66 of the webs 60 and 61. The outer peripheral edge 65 of each mixing paddle 56 is at a radius R from the main central axis 39. The dimensions of the radius R depend on the capacity of the mixing compartment 4. However, typically, the radius will range from 700 mm to 950 mm. In three particularly preferred embodiments of the invention, the radius R is 910 mm, 830 mm and 746 mm, respectively.

Accordingly, in these three sizes of apparatus, the ratio of the radial width r of the leading surface 69 to the radius R of the outer peripheral edge 65 is approximately 1:9.1, 1:8.30 and 1:7.46, respectively.

The radius of the inner surface 75 of the base 28 of the side wall 29 from the main central axis 39 is set to provide a clearance between the outer peripheral edge 65 of the mixing paddles 56 and the inner surface 75 of approximately 5 mm. Thus, the radius of the inner surface 75 of the base 28 in the case of the mixer feeder wagon 1 where the radius R is 910 mm, is 915 mm. Likewise, where the radius R of the mixing rotor 7 is 830 mm, the radius of the inner surface 75 is 835 mm. The radius of the inner surface 75 of the base 28 is 751 mm when the radius R of the mixing rotor 7 is 746 mm.

Scraper members 79 of flat steel plate material extend from the carrier members 57 which are adjacent the front and rear end walls 36 and 37 for scraping animal feed from the end walls 36 and 37. The scraper members 79 are welded to the respective carrier members 57 and extend towards the end walls 36 and 37, but do not engage the end walls 36 and 37. Additionally, the scraper members 79 are directed in a slightly forwardly direction relative to the direction of movement of the carrier members 57 as the mixing rotor 7 rotates in the direction of the arrow A. Pairs of gusset plates 80 welded to the carrier members 57 and the scraper members 79 reinforce the scraper members 79.

Drive transmission 72 which comprises chain and sprocket drives are provided on the front end wall 36 for driving the mixing rotor 7 in the direction of the arrow A for mixing the ingredients of the animal feed in the mixing compartment 4 and for rotating the dispensing auger 8 in the direction of the arrow B for dispensing mixed animal feed through the dispensing outlet 11. The drive transmission 72 is similar to drive transmission which is described in British Patent Specification No. 2,139,911. A main drive shaft 73 extending from a gear box 74 delivers drive to the drive transmission means 72. The main drive shaft 73 is splined for receiving a drive shaft for providing drive, from, for example, the power take-off shaft of a tractor.

The drive transmission 72 is arranged so that the gear ratio between the dispensing auger 8 and the mixing rotor 7 is 90:11.1. The preferred rotational speed of the mixing rotor 7 is approximately 11.1 revolutions per minute, thus, causing the dispensing auger 8 to rotate at a rotational speed of approximately 90 revolutions per minute.

A stationary support blade 77 (only illustrated in FIG. 2) is mounted to the side wall 30 by a mounting bracket 78 and extends across the open mouth 38 above the mixing rotor 7 for supporting blocks of silage or other fibrous material above the mixing rotor 7. The stationary blade 77 is located approximately half-way between the front end wall 36 and the rear end wall 37 and extends parallel to the respective end walls 36 and 37. The stationary blade 77 co-operates with the mixing rotor 7 for facilitating breaking up of the block of silage or other fibrous material. The co-operating action between the mixing rotor 7 and the stationary blade 77 is described in detail in European Patent Specification No. 0,427,483A.

An hydraulic valve (not shown) is provided for controlling the operation of the ram (also not shown) for operating the closure plate 50 and the door 46 and for receiving an hydraulic fluid supply from the tractor (not shown).

In use, the mixer feeder wagon 1 is hitched to a tow bar of a tractor or other suitable towing vehicle. The power take-off shaft of the tractor is connected to the main drive shaft 73 by a suitable transmission shaft for driving the mixing rotor 7 and the dispensing auger 8 through the drive transmission 72. An hydraulic fluid supply from the tractor is connected to the hydraulic valve (not shown) of the ram (also not shown) for operating the closure plate 50 and the door 46. With the closure plate 50 in the lower closed position and the door 46 closed, and the mixing rotor 7 rotating in the direction of the arrow A ingredients of the animal feed ration are loaded into the mixing compartment 4 and thoroughly mixed therein. On the animal feed ration being thoroughly mixed, and when it is desired to dispense the animal feed from the mixer feeder wagon 1, the closure plate 50 is raised into the open position, and the door 46 is opened. The rotational action of the mixing rotor 7 in the direction of the arrow A urges mixed animal feed into the dispensing compartment 5, which is in turn dispensed through the dispensing outlet 11 by the action of the dispensing auger 8.

It has been surprisingly found that by providing each mixing paddle 56 with the bevelled trailing surface 71, the power requirement for rotating the mixing rotor 7 during mixing of the animal feed in the mixing compartment 4, and also during delivery of the animal feed from the mixing compartment 4 into the dispensing compartment 5 is significantly reduced over the power requirement when the trailing surface of the mixing paddle extends tangentially to the locus of the periphery of the mixing rotor. It is believed that the provision of the bevelled trailing surface 71 minimizes, and in most cases prevents any build up of and collection of ingredients, particularly, the fibrous material of the ingredients, such as, for example, hay, straw and the long cut silage on the mixing paddles, which it has been found otherwise occurs when the trailing surface of the mixing paddles is tangential to the locus of the periphery of the mixing rotor. It is possible that the co-operating action of the bevelled trailing surface 71 of each paddle 56 with the inner surface 75 of the base 28 and side wall 29 prevents fibrous material collecting on the trailing surface 71, and where such fibrous material commences to collect, the co-operating action between the trailing surface 71 and the surface 75 of the base 28 and side wall 29 urges such collected fibrous material to dislodge from the trailing surface 71, and in turn, from the mixing paddle 56. By preventing the build up and by dislodging fibrous material from the trailing surface 71, there is little opportunity for other ingredients of the animal feed to collect on the trailing surface 71. The absence of a build up of material on the trailing surface 71 of the mixing paddles 56 thus minimizes any frictional resistance between the mixing rotor 7 and the inner surface 75 of the base 28 and side wall 29, thereby significantly reducing the power requirement for rotating the mixing rotor 7. These advantages are particularly apparent when the wagon is being used for mixing and dispensing animal feed rations which include silage and has a dry matter content of 30% or greater. The advantages are also particularly apparent when the animal feed ration contains hay and straw, which likewise has a high dry matter content. Indeed, the wagon has been used for mixing animal feed rations with hay and a dry matter content of 60% and there has been no evidence of the silage or other ingredients collecting on the mixing paddles 56.

Referring now to FIG. 7 there is illustrated a mixing paddle 100 for a mixer feeder wagon according to another embodiment of the invention. The mixing paddle 100 is substantially similar to the mixing paddle 56, and similar components are identified by the same reference numerals. The main difference between the mixing paddle 100 and the mixing paddle 56 is that the mixing paddle 100 is mounted at the very end 101 of the carrier member 57, in other words, the web 61 of the angle member 59 of the mixing paddle 100 is welded to the free end 101 of the respective pairs of carrier members 57.

Referring now to FIGS. 8 to 10, there is illustrated a mixing rotor 110 for use in a mixer feeder wagon (not shown) according to a further embodiment of the invention. The mixer feeder wagon, which is not illustrated, is substantially identical to that described with reference to FIGS. 1 to 6, and indeed, the mixing rotor 110 could be mounted in the mixer feeder wagon 1 of FIGS. 1 to 6. The mixing rotor 110 is substantially similar to the mixing rotor 7 of the mixer feeder wagon 1, and similar components are identified by the same reference numerals. The main difference between the mixing rotor 110 and the mixing rotor 7 is that a wiper 112 is secured to the plate 62 and extends from the trailing surface 71 of each mixing paddle 56. The wipers 112 are of a relatively flexible, but at the same time resilient plastics material and extend outwardly from the trailing surface 71 for wiping along the inner cylindrical surface 75 of the mixing compartment 4 for dislodging animal feed from the inner cylindrical surface 75, and also for urging remaining particles of animal feed into the dispensing compartment 5 as the mixing compartment 4 is almost empty. The wipers 112 are secured to the plate members 62 by respective clamping plates 114 and screws 115 which engage threaded holes (not shown) in the plate members 62. The wipers 112 extend along their corresponding mixing paddles 56 for approximately half the length of the mixing paddle 56. As can be seen in FIG. 8, the wipers 112 on the respective mixing paddles 56 are staggered so that each quarter length of the inner cylindrical surface 75 is wiped by one of the wipers 112.

It has been found that the provision of the wipers 112 extending from the trailing surfaces 71 does not have any adverse effect on the mixing paddles, and does not cause any build-up of fibrous material on the mixing paddles, thereby, the advantages of the invention are still achieved even when the mixing paddles of the mixing rotor are provided with wipers 112.

While the mixing paddles have been described as being of hollow triangular transverse cross-section, while this is a preferable transverse cross-section, it is not essential that the mixing paddles be hollow, and furthermore, in certain cases, it is envisaged that the mixing paddles may comprise only a web 60 which forms the leading surface 69 and a plate 62 which forms the trailing surface 71. In other words, the web 61 may be dispensed with. It will also be appreciated that the included acute angle $\alpha$ between the leading and trailing surfaces 69 and respectively, may be other than 45°. It is believed, that reasonable results would be achieved provided the included acute angle lies in the range of 20° to 80°, although, preferred results are achieved when the included angle $\alpha$ lies in the range of 30° to 60°.

It will of course be appreciated that other constructions of carrier member for carrying the mixing paddles on the rotor shaft may be provided, indeed, in certain cases it is envisaged that a single carrier member may be provided for carrying each mixing paddle.

While the mixer feeder wagon has been described as comprising a dispensing compartment of a particular shape and construction which also comprises a dispensing means provided by a dispensing auger, any other suitable dispensing compartment and dispensing means may be provided. Indeed, in certain cases, it is envisaged that the dispensing means may be dispensed with, as may the dispensing compartment be dispensed with.

While the mixing rotor has been described as being rotated at a speed of approximately 11.1 revolutions per minute, it is envisaged that the mixing rotor may be rotated at a speed in the range of 2 revolutions per minute to 40 revolutions per minute, although, in general, it is envisaged that the mixing rotor will be rotated at a speed in the range of 1 revolution per minute to 30 revolutions per minute, and preferably, at a speed in the range of 3 revolutions per minute to 15 revolutions per minute.

While the mixing rotors described have been described as each comprising four mixing paddles, in certain cases, the mixing rotor may be provided with more than four mixing paddles. Indeed, in the case of mixing compartments which are relatively long axially, it is envisaged that three sets of mixing paddles may be provided located longitudinally along the rotor shaft. In which case, the mixing paddles of adjacent sets would be arranged at 90° around the rotational axis of the mixing rotor relative to each other. It is also envisaged that in certain cases the mixing paddles may be disposed relative to each other at other angular positions around the rotational axis of the mixing rotor. For example, in certain cases, it is envisaged that the mixing paddles of adjacent sets may be arranged at 120° to each other.

It is also envisaged that the door 46 which closes the dispensing outlet 11 may be replaced by a flap of flexible material, such as, for example, a flap of flexible resilient plastics or rubber material, in which case, other arrangements for locating the chute from the dispensing outlet would be provided.

While the wipers have been described as being of flexible but resilient plastics material, they may be of any other suitable material, and while it is preferable that they should be resilient, in certain cases, the wipers may only be flexible.

We claim:

1. Apparatus for mixing and dispensing fibrous materials, the apparatus (1) comprising a container (2) defining a hollow interior region (3) which forms an elongated mixing compartment (4) of substantially semi-circular transverse cross-section defining a longitudinally extending main central axis (39) which is co-axial with the axis of generation of the semi-circular portion (28) of the mixing compartment (4), a mixing rotor (7) being rotatable in the mixing compartment (4) about a rotational axis coinciding with the main central axis (39), the mixing rotor (7) comprising at least one mixing paddle (56) for mixing material in the mixing compartment (4), the mixing paddle (56) extending substantially longitudinally relative to the main central axis (39) and having a leading surface (69) extending substantially longitudinally and radially relative to the main central axis (39) and terminating in an outer free edge (65) extending in a generally longitudinal direction and defining an outer peripheral edge (65) of the mixing paddle (56), characterised in that the mixing paddle (56) is further provided with a bevelled trailing surface (71) extending from the outer free edge (65) of the leading surface (69) and defining with the leading surface (69) an included acute angle (α).

2. Apparatus as claimed in claim 1 characterised in that the included acute angle (α) between the leading surface (69) and the trailing surface (71) is in the range of 20° to 70°.

3. Apparatus as claimed in claim 2 characterised in that the included acute angle (α) between the leading surface (69) and the trailing surface (71) is in the range of 30° to 60°.

4. Apparatus as claimed in claim 3 characterised in that the included acute angle (α) between the leading surface (69) and the trailing surface (71) is approximately 45°.

5. Apparatus as claimed in claim 1 characterised in that each mixing paddle (56) is of triangular transverse cross-section, the leading and trailing surfaces (69,71) being respectively formed by two sides of the triangle, the leading surface (69) extending radially outwardly from the third side (61) of the triangle.

6. Apparatus as claimed in claim 5 characterised in that the leading surface (69) extends perpendicularly from the third side (61) of the triangle.

7. Apparatus as claimed in claim 1 characterised in that each mixing paddle (56) is of hollow transverse cross-section.

8. Apparatus as claimed in claim 1 characterised in that the mixing rotor (7) comprises a rotor shaft (55) rotatably mounted in the mixing compartment (4), the rotor shaft (55) defining the rotational axis (39) of the mixing rotor (7), each mixing paddle (56) being carried on at least one carrier member (57) extending radially from the rotor shaft (55).

9. Apparatus as claimed in claim 8 characterised in that each mixing paddle (56) is carried on a pair of carrier members (57) spaced apart longitudinally along the rotor shaft (55).

10. Apparatus as claimed in claim 9 characterised in that each mixing paddle (56) is mounted to its corresponding carrier members (57) adjacent the outer free radial end (68) thereof.

11. Apparatus as claimed in claim 1 characterised in that the ratio of the radial width (r) of the leading surface (69) of each mixing paddle (56) to the radius (R) of the peripheral edge (65) of the leading surface of the mixing paddle (56) from the rotational axis (39) of the mixing rotor (7) is in the range of 1:20 to 1:2.

12. Apparatus as claimed in claim 1 characterised in that the ratio of the radial width (r) of the leading surface (69) of each mixing paddle (56) to the radius (R) of the peripheral edge (65) of the leading surface (69) of the mixing paddle (56) from the rotational axis (39) of the mixing rotor (7) is in the range of 1:10 to 1:7.

13. Apparatus as claimed in claim 1 characterised in that the trailing surface (71) defines a longitudinally extending inner edge (70) spaced apart from the rotational axis (39) of the mixing rotor (7), the radial distance (R) between the outer peripheral edge (65) of the leading surface (69) and the inner edge (70) of the trailing surface (71) being substantially similar to the radial width (r) of the leading surface (69).

14. Apparatus as claimed in claim 1 characterised in that the radial width (r) of the leading surface (69) of each mixing paddle (56) is in the range of 50 mm to 300 mm.

15. Apparatus as claimed in claim 1 characterised in that the radial width (r) of the leading surface (69) of each mixing paddle (56) is approximately 100 mm.

16. Apparatus as claimed in claim 1 characterised in that the substantially semi-cylindrical portion (28) of the mixing compartment (4) forms the base (28) of the mixing compartment (4).

17. Apparatus as claimed in claim 16 characterised in that the mixing compartment (4) defines an upwardly directed open mouth (38) for providing access to the mixing compartment (4).

18. Apparatus as claimed in claim 16 characterised in that the hollow interior region (3) of the container forms a dispensing compartment (5) through which material is dispensed from the apparatus (1) through a dispensing outlet (11) which is formed in the dispensing compartment (5), the dispensing compartment (5) defining a longitudinally extending central-axis (45), and extending substantially parallel to the mixing compartment (4) and communicating with the mixing compartment (4) through a communicating opening (6), the communicating opening (6) lying in a plane extending substantially parallel to the main central axis (39), a dispensing means (8) being located in the dispensing compartment (5) for dispensing the material from the dispensing compartment (5).

19. Apparatus as claimed in claim 18 characterised in that a closure means (50) is provided for isolating the dispensing compartment (5) from the mixing compartment (4), the closure means (50) being operable between a closed position closing the communicating opening (6) to an open position with the two compartments (4,5) communicating through the communicating opening (6).

20. Apparatus as claimed in claim 18 characterised in that the dispensing compartment (5) extends sidewardly outwardly from the mixing compartment (4) for accommodating passage of material to and from the dispensing compartment (5) between the mixing and dispensing compartments (4,5).

* * * * *

UNITED STATES PATENT AND TRADEMARK OFFICE
CERTIFICATE OF CORRECTION

PATENT NO. : 5,645,345
DATED : July 8, 1997
INVENTOR(S) : Oliver O'Neill et al.

It is certified that error appears in the above-identified patent and that said Letters Patent is hereby corrected as shown below:

On the title page, item [22] should read as follows:
--[22] PCT Filed: Mar. 10, 1994--

Signed and Sealed this

Sixth Day of January, 1998

Attest:

Attesting Officer

BRUCE LEHMAN

*Commissioner of Patents and Trademarks*